United States Patent [19]
Kudoh

[11] Patent Number: 5,148,486
[45] Date of Patent: Sep. 15, 1992

[54] VOICE DECODING DEVICE

[75] Inventor: Norimasa Kudoh, Kawasaki, Japan

[73] Assignee: Kabushiki Kaisha Toshiba, Kawasaki, Japan

[21] Appl. No.: 700,321

[22] Filed: May 9, 1991

Related U.S. Application Data

[63] Continuation of Ser. No. 293,847, Jan. 5, 1989, abandoned.

[30] Foreign Application Priority Data

Mar. 30, 1988 [JP] Japan .................. 63-74544

[51] Int. Cl.⁵ .................................. G10L 5/00
[52] U.S. Cl. ................................ 381/36; 381/46
[58] Field of Search ...................... 381/36, 46

[56] References Cited

U.S. PATENT DOCUMENTS

4,710,960 12/1987 Sato ........................................ 381/47
4,907,277 3/1990 Callens et al. ........................ 381/46

Primary Examiner—Emanuel S. Kemeny
Attorney, Agent, or Firm—Finnegan, Henderson, Farabow, Garrett and Dunner

[57] ABSTRACT

A voice decoding device for reproducing the sound information which is encoded in a predetermined frame unit and packet-transmitted is provided. An interframe-predicting unit continuously predicts a series of data over plural frames. A control unit always monitors whether the absence of a packet occurs or not. When the absence of a packet is detected, a selector is switched, and the decoding processing of the voice signal is performed using a series of predicted data over plural frames obtained at the interframe-predicting unit instead of a series of received data used in the usual voice decoding processing.

21 Claims, 3 Drawing Sheets

VOICE DECODING DEVICE

This application is a continuation of application Ser. No. 07/293,847, filed Jan. 5, 1989 now abandoned.

BACKGROUND OF THE INVENTION

1. Field of the Invention

This invention relates to a voice decoding device capable of effectively reproducing voice information which is compression-coded in a predetermined frame unit and packet-transmitted.

2. Description of the Related Art

Recently, packet transmission is attracting notice as a high-efficiency information transmission method. In the communication of voice information too, there is an attempt to perform a high-efficiency communication with a packet communication network.

Now, at packet communication in the usual data transmission, in order to deal with the outstripping of packet, i.e., the exchange of packet order, due to the difference in transmission channels within the network, a measure is taken, such as the rearrangement of packet order by buffering, the retransmission of packet or the like.

At the packet transmission of voice signals, the naturalness of conversation is more important than the correctness of transmitted information. Hence, when exchange in the order of packets occurs and excessive delay is needed to rearrange into regular order, a processing is performed such that packet data are decoding-processed without temporal exchange by discarding one of the exchanged packets, and sound signals are reproduced. When a packet is thus discarded, however, a discontinuous part is produced in the reproduced voice signal waveform caused by the absence of a packet due to the discard, and inconveniences occur such that an uncomfortable sound is generated at the discontinuous part, and the clearness of the reproduced voice is decreased, or the like.

Figure 1:
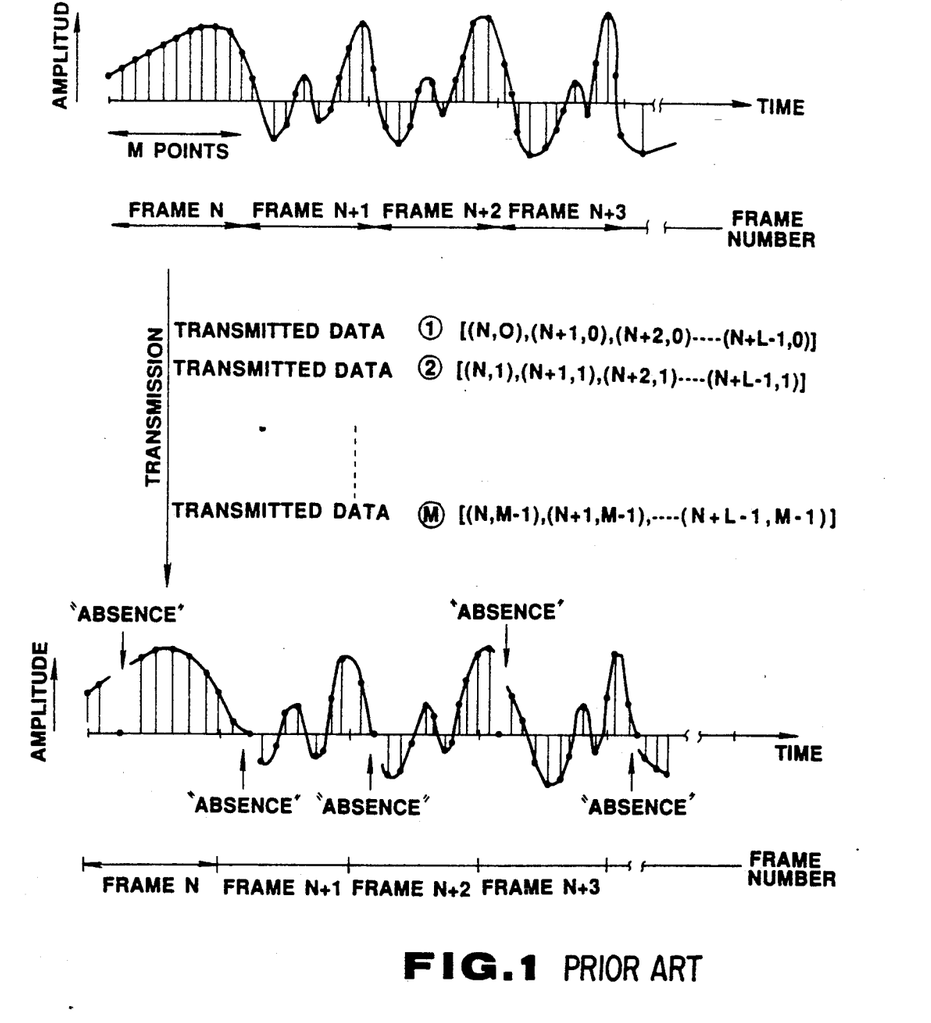
FIG. 1 is a diagram for explaining problems with conventional packet transmission of a voice signal.

Accordingly, in the conventional system, for example as shown in FIG. 1, the voice signal X(n) sampled at a predetermined period is frame-decomposed at every M points, and the voice signal X(n) at each frame, is sequentially extracted one by one over continuous L frames to produce packets, and these packets are transmitted. That is, when the above-described voice signal X(n) is indicated for each frame as:

$$Xf(l,m) = X(lM+m),$$

where $l$ ($0 \leq l < L$) is the frame number, m ($0 \leq m < M$) is the data index within each frame, M-sets packet data Xf (l,m) to be transmitted in packet are obtained as follows:

$\{X(0,0), X(1,0), \cdots X(L-1,0)\}$     ①

$\{X(0,1), X(1,1), \cdots X(L-1,1)\}$     ②

$\{X(0,M-1), X(1,M-1), \cdots X(L-1,M-1)\}$     Ⓜ

At the reception side (decoding device), the data Xf (l,m) thus packet-transmitted are rearranged relative to the M packets, the series of the above-described voice data X (l,m) are decoded, and then the voice signals thereof are reproduced.

By taking such measures, even when, for example, the absence of a packet (the packet 3 in this example) occurs in a part of the data, the omission in the voice signal X(n) in the reproduced data frame is only one sample at each frame as shown in FIG. 1, and hence it is possible to supplement the influence of omission by interpolation or the like from the preceding and succeeding data. As a result, it becomes possible to maintain the quality of the packet-transmitted sound, and also to prevent the occurrence of uncomfortable sound described above.

In packet transmission, however, there exists an overhead, such as the reception-side-addressing head, and so the length of a packet cannot be too short from the viewpoint of transmission efficiency. Moreover, in order to adopt the above-described technique, it is necessary to set the number L of sound frames to be relatively large. This indicates that it is necessary to store voice data over L frames at packet transmission. Hence, a large amount of time delay inevitably occurs before the input voice is packet-transmitted, and also before the received packets are decoded to reproduce sound signals.

Moreover, in such a method, the transmission of voice packets is only applicable to the compression coding (the compression ratio is not more than ½) of the information in which the transmitted data have the same meaning within a frame, such as ADPCM, ADM or the like. Furthermore, even when the conventional method is applied to the predictive residual signals, the interpolation gain of the predictive residual signal is small, and the deterioration of decoded sound is not negligible.

Figure 2:
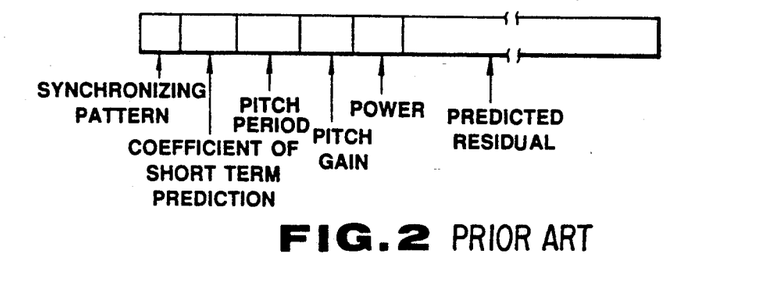
FIG. 2 is a configurational diagram of a frame of a transmitted packet by the compression-coding in frame unit.

On the other hand, it is necessary to consider the case that a frame configuration as shown in FIG. 2 is adopted, and the voice information is compression-coded in frame unit and packet-transmitted. By adopting such a configuration, a high-efficiency compression coding for each frame becomes possible, and, for example, it is possible to realize a compression coding having a compression ratio of larger than 4 in frame unit. However, in the packet transmission of voice data in which such a frame processing is performed, each packet has information which has a different meaning for each field. Hence, there is a problem such that even when the absence of a packet occurs, it is impossible to take the above-described measures, such as interpolation or the like.

As described above, with the conventional packet transmission of voice, there exist various problems, such as the occurrence of uncomfortable sound due to the absence of a packet, the delay time from the input of packet data to the decoding and output thereof, the impossibility of taking measures against the absence of a packet for compression coding in which frame processing is performed, or the like.

The present invention takes into consideration such circumstances. It is an object of the present invention to provide a highly-practical voice decoding device which is capable of effective packet transmission of voice signals without causing the problems of the absence of a packet or delay time.

SUMMARY OF THE INVENTION

The present invention provides a voice decoding device used in a system in which voice signals are sampled, compression-coded in a predetermined frame unit and packet-transmitted, and reproduced voice signals are produced by decoding-processing the received packets. The device comprises means which continuously predicts a series of data, packet-transmitted in a predetermined frame unit over plural frames at an interframe-predicting unit, as well as detects the absence of a packet from the continuity of the received packets, and when the absence of a packet is detected by this means, decodes and reproduces voice signals using the data series predicted at the above interframe-predicting unit instead of data series obtained from the received packets.

According to the present invention, even when voice signals are compression-coded in a frame unit and packet-transmitted, an interframe-predicting unit in a decoding unit continuously predicts the data series over plural frames, and also always monitors whether the absence of a packet occurs or not. When the absence of a packet is detected, the decoding-processing of sound signals is performed using the predicted data series over plural frames obtained at the above-described interframe-predicting unit instead of received data series used in the normal sound decoding processing.

As a result, even when the absence of a packet occurs, it is possible to effectively complement the decoded voice signal in the absent portion, prevent the generation of uncomfortable sound, and thus maintain the quality of the reproduced sound. Moreover, since the decoding processing is performed separately for each data packet which has been compression-coded in a predetermined frame unit, i.e., there is no necessity of performing the processing of rearrangement of data series or the like over plural packets, and time delay does not cause a problem.

As described above, according to the present invention, many practical effects can be obtained such that the problem of delay time can be effectively avoided; the packet transmission of voice by compression coding in frame unit becomes possible; and at the same time a high-quality decoding-reproduction of voice information becomes possible effectively complementing the absence of a packet, or the like.

DESCRIPTION OF THE PREFERRED EMBODIMENT

An embodiment of the present invention will be hereinafter explained with reference to the drawings.

Figure 3:
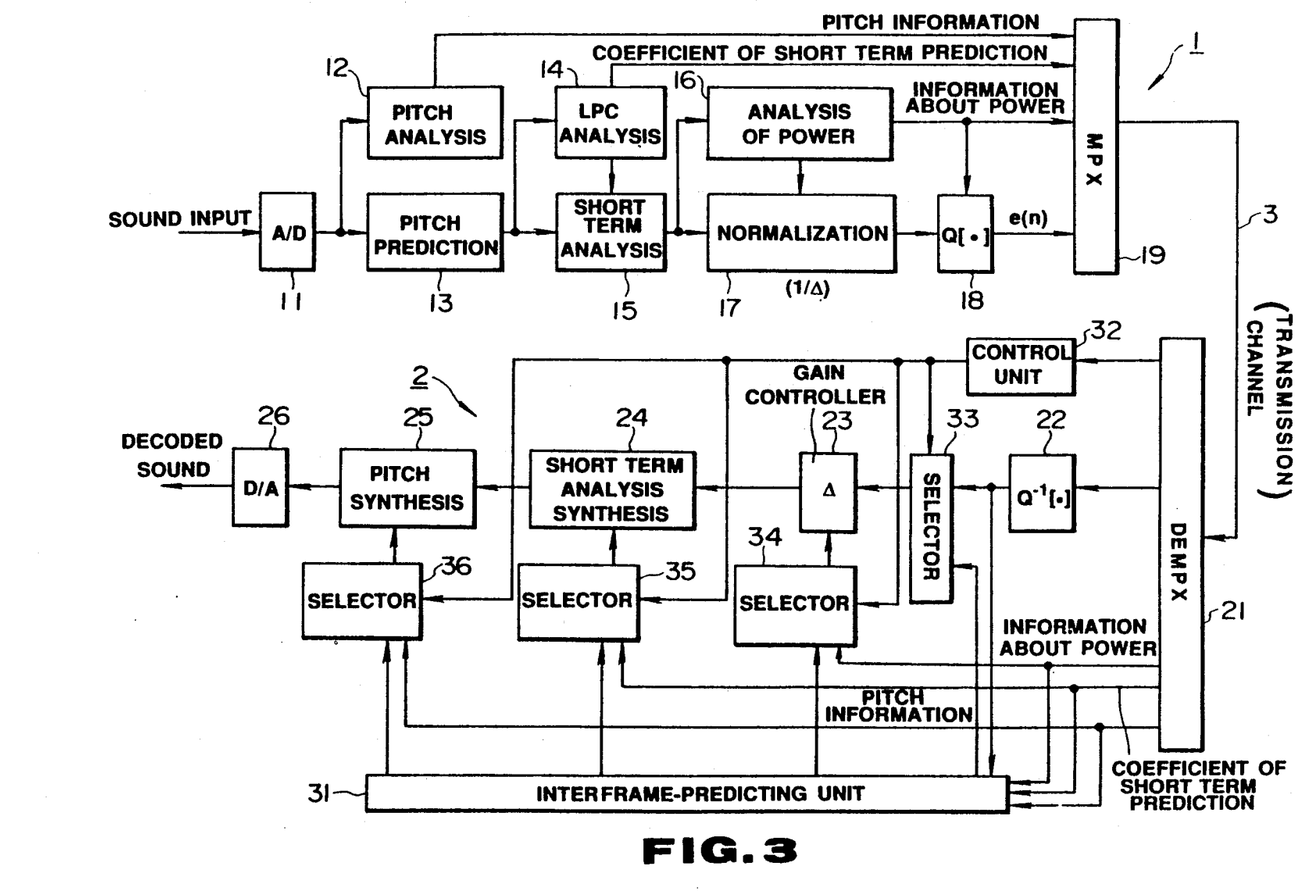
FIG. 3 is a schematic configurational diagram of a packet transmission system configured using a sound decoding device according to an embodiment of the present invention.

FIG. 3 is a schematic configurational diagram of a voice-packet transmission system provided with a voice decoding device according to an embodiment of the present invention. The system includes a packet-transmitting unit 1 provided with a coding unit and a packet-receiving unit 2 provided with a decoding unit according to the present invention. The packet-transmitting unit 1 and the packet-receiving unit 2 are mutually connected via a predetermined packet-transmission channel 3. It goes without saying that the packet-transmission channel 3 is constituted by packet exchanges and various packet-communication networks.

In FIG. 3, explanation will be first made concerning the packet-transmitting unit 1 which is the basis of the packet transmission of voice signal. At the packet-transmitting unit 1, input voice signals are sampled and digitized at a predetermined period via an A/D converter 11, compression-coded in a predetermined frame unit and taken in as a series of voice data X(n) used for the packet transmission thereof.

In a coding unit of the packet-transmitting unit 1, a pitch-analyzing unit 12 analyzes the fundamental voice frequency component of the above-described voice data X(n) as the pitch information. A pitch-predicting unit 13 removes the redundancy in accordance with the result of the analysis. That is, the redundancy is removed in accordance with the correlation of voice signal over a long term. Next, in order to remove the redundancy over a short term, an LPC analyzing unit 14 analyzes the coefficient of short term prediction. A short term predicting unit 15 performs predictive processing in accordance with the result.

Next, for the residual signal (predictive residual) which is not removed at the above-described pitch prediction and short term prediction, the information about the short term of residual signal power thereof within a pre-determined frame (a group of predetermined sample numbers) is obtained at a power-analyzing unit 16. The above-described prediction residual is normalized ($1/\Delta$ times) at a normalizing unit 17 using the information about the electric power. Subsequently, the normalized prediction residual is quantized at a quantizer 18, and the quantized code e(n) thereof is obtained. The above-described pitch information, coefficient of short term prediction, information about the power of the residual signal, and quantized code e(n) of the normalized prediction residual signal obtained by the series of processing steps are multiplexed at the above-described frame configuration shown in FIG. 2 at a multiplexer (MPX) 19, and thus encoding of a voice signal within the frame is performed. The compression-coded information is then transmitted as a unit of packet data via the above-described transmission channel 3.

It will be noted that the above-described encoding processing of a voice signal is the same as the conventional sound encoder which executes encoding processing in a predetermined frame unit.

The present invention has a feature in the configuration of a decoding device of the packet-receiving unit 2 which decodes and reproduces the above-described voice signal X(n) from data compression-coded in a predetermined frame unit, and sequentially packet-transmitted from the above-described packet-transmitting unit 1.

The decoding device basically analyzes and extracts the above-described pitch information, coefficient of short term prediction, information about the power and quantized code e(n) of the normalized prediction residual signal, respectively, from the received packets by a demultiplexer (DEMPX) 21, in order to decode the information compression-coded in the frame unit as described above, and obtains the normalized residual signal from the above-described quantized code e(n) at a inverse-quantizer 22. The residual signal is then restored at a gain controller unit 23 from the reproduced normalized prediction residual signal and the above-described information about the electric power. The voice signal X(n) is synthesized at a LPC synthesizing unit 24, pitch-synthesizing unit 25 by using both above-described coefficient of short term prediction and pitch information. The decoded voice signal X(n) is converted to an analog signal by a D/A converter 26. The basic configuration of these units is the same as in the conventional decoding device.

However, the present decoding device has a feature in that it comprises an interframe-predicting unit 31 which predicts the received data coming from the data of received packets over plural frames in accordance with the pitch information, coefficient of short term prediction and information about the power obtained at the above-described demultiplexer (DEMPX) 21 and the normalized prediction residual signal obtained from the quantized code e(n) at the above-described inverse-quantizer 22, and a control unit 32 which detects whether the next packet is received within a predetermined time via the demultiplexer (DEMPX) 21, and controls the operations of a selector 33 for the residual signal and processing units 36, 35 and 34 for the above-described pitch information, coefficient of short term prediction and information about the power, respectively, in accordance with the detection result.

The control unit 32 monitors, from the property that packets are continuously transmitted within a certain time interval when the packet-transmitted voice information is received, the time from the reception of a packet at a certain timing to the reception of the next packet, and detects whether the absence of a packet has occurred or not. When the absence of a packet is detected, the control unit 32 performs the switching control of the above-described selectors 33, 34, 35 and 36, and has the above-described interframe-predicting unit 31 performs the decoding processing of voice data using the pseudo prediction residual signal, pseudo pitch information, pseudo coefficient of short term prediction and pseudo information about the power predicted over plural frames at the above-described interframepredicting unit 31 instead of the decoding processing of voice data from the decoding processing of voice data from the received packet data described above. The interframe-predicting unit 31 predicts such pseudo prediction residual signal, pseudo pitch information, a pseudo coefficient of short term prediction, and pseudo information about the power over plural frames. The interframe predicting unit predicts the signals based on the fact that the statistical property of voice information is stationary within an interval of about 20–30 ms. Thus, the data to be received in the future (the next frame) is determined from the present and past received data. This predictive processing is performed by a learning mechanism. That is, relative to the pitch information, the coefficient of short term prediction and information about the power, the interframe-predicting unit 31 performs the interframe prediction as follows:

$$\hat{A}(N+1) = f(A(N), A(N-1), \cdots A(N-K), E(N))$$
$$E(N) = \hat{A}(N) - A(N)$$

$\hat{A}(N+1)$ ; the predictive value at the moment (N + 1) relative to the present N $f(A(N), A(N-1), \cdots A(N-K), E(N))$ ; the linear function which predicts the moment (N + 1) from the present and past received data $E(N)$ ; the difference between the predicted value and the received data.

The normalized residual signal is also predicted, by a learning mechanism, based on the modeled data of a pulse train, white noise, or the linear combination of the both from the present and past received data, and the actual received data.

The interframe prediction will be further explained in more detail. The voice signal can be represented on the z-transform plane as follows from the generation mechanism thereof.

$S(z) = \sigma L \cdot E(z) \cdot A(z) \cdot P(z)$ $S(z)$; the z-transform of the voice signal S (n)
$\sigma L$; the electric power of the remnant signal
$E(z)$; the z-transform of the residual signal eL(n)
$A(z)$; the z-transform of the series of the coefficient of short term prediction AL(n)
$P(z)$; the z-transform of the coefficient of pitch prediction PL(n)

Now, for each of the above-described $\theta L$, E(z), A(z) and P(z), the present frame data will be predicted from the data of the past received frames. It will be noted that by storing received frames in a memory, it is possible to predict the frame data, when the absence of a packet has occurred, from the past and future received frames.

The residual signals e L(n)[n=0, 1, ~N−1] which will be received at the present frame L are predicted from the past remnant signals e L−1(n) as follows:

$$eL(n) = \alpha L \, Sp(n) + \beta L \, Sn(n) \tag{1}$$
$$\alpha L = T \cdot \alpha L - 1$$

$T$; the maximum value of the normalized autocorrelation $V(n)$ about $eL - 1(n)$ from $k$max to $k$min $$T = \max\left\{ \left(1 / \sum_{n=0}^{N-1} eL - 1(n)\right) \sum_{n=0}^{N-1-K} eL - 1(n)eL - 1(n+k) \right\}$$

$K\text{max} \leq K \leq K\text{min}$
$\beta L = (1 - \alpha L)\beta L - 1$ $$Sp(n) = \begin{cases} 1 & (n = 1); \text{impulse} \\ 0 & (n = 0) \end{cases}$$

$Sn(n)$; white noise (series of coefficient).

The residual signal e L(n) differs in its property depending on whether it is a voiced signal or voiceless signal. It is predicted as the impulsive signal in the case of a voiced signal, and predicted by approximating with white noise in the case of voiceless signal. The residual signal e L−1(n) used in the above calculation of αL is actually the inverse-quantizing value e L−1(n) obtained at the above-described inverse-quantizer 22, and becomes a parameter indicating the degree of voiced signal in the above-described signal L−1(n). The parameter αL can be obtained from e L−1(n) and L−1 described above.

Further, βL is a parameter indicating the degree of voiceless signal, and can be calculated from αL and βL−1.

On the other hand, the electric power σL of the above-described remnant signal is calculated as:

$$\Delta L = \Delta L - 1 + \Delta \sigma L - 1 \tag{2},$$

where $\Delta \sigma L - 1$ is the difference between $\sigma L - 2$ and $\sigma L - 1$.

The coefficient of short term prediction A L(n−1) [n=0, 1, ∼p; p is the order of prediction] is, for example, transformed into the LSP parameter, as a parameter capable of easily performing interframe prediction, and the prediction is made using the LSP parameter. Subsequently, the predictive value, i.e., the coefficient of short term prediction, A L(n), is obtained by retransformation from the predicted LSP parameter. The following calculation is performed with the LSP parameter:

$$LSP\ L,m = \alpha L\ (LSP\ L - 1,m + 1 - LSP\ L - 1,m) + \beta L \Delta LSP\ L - 1,m, \quad (3)$$

and the predictive value thereof is obtained. In the above-described formula, LSP L−1,m is the m−th LSP parameter in the (L−1)−th frame, and Δ LSP L−1,M is is the difference between LSP L−2,m and LSP L−1,m.

Now it is known that the above-described LSP parameter has a property, in the case of voiced signal, that the values are very close between adjacent LSP parameters, i.e., LSP L,m+1 and LSP L,m, for a certain m. On the contrary, in the case of voiceless signal, the values are largely different between adjacent parameters for each m. Hence, the predicting processing shown in Formula (3) described above is given as the linear combination of the prediction for voiced sound shown in the first term and the prediction for voiceless sound shown in the second term.

Further, for the pitch information, the pitch gain G thereof is predicted as:

$$GL = GL-1 + \Delta GL-1 \quad (4)$$

and, the period of pitch thereof is predicted as:

$$mL = m\ L-1 + \Delta mL-1 \quad (5),$$

where

ΔG L−1 ; the difference between G L−2 and G L−1
Δm L−1; the difference between m L−2 and m L−1.
The coefficient of pitch prediction P L(n) can be obtained based on the above-described pitch gain, G and pitch period, m.

Figure 4:
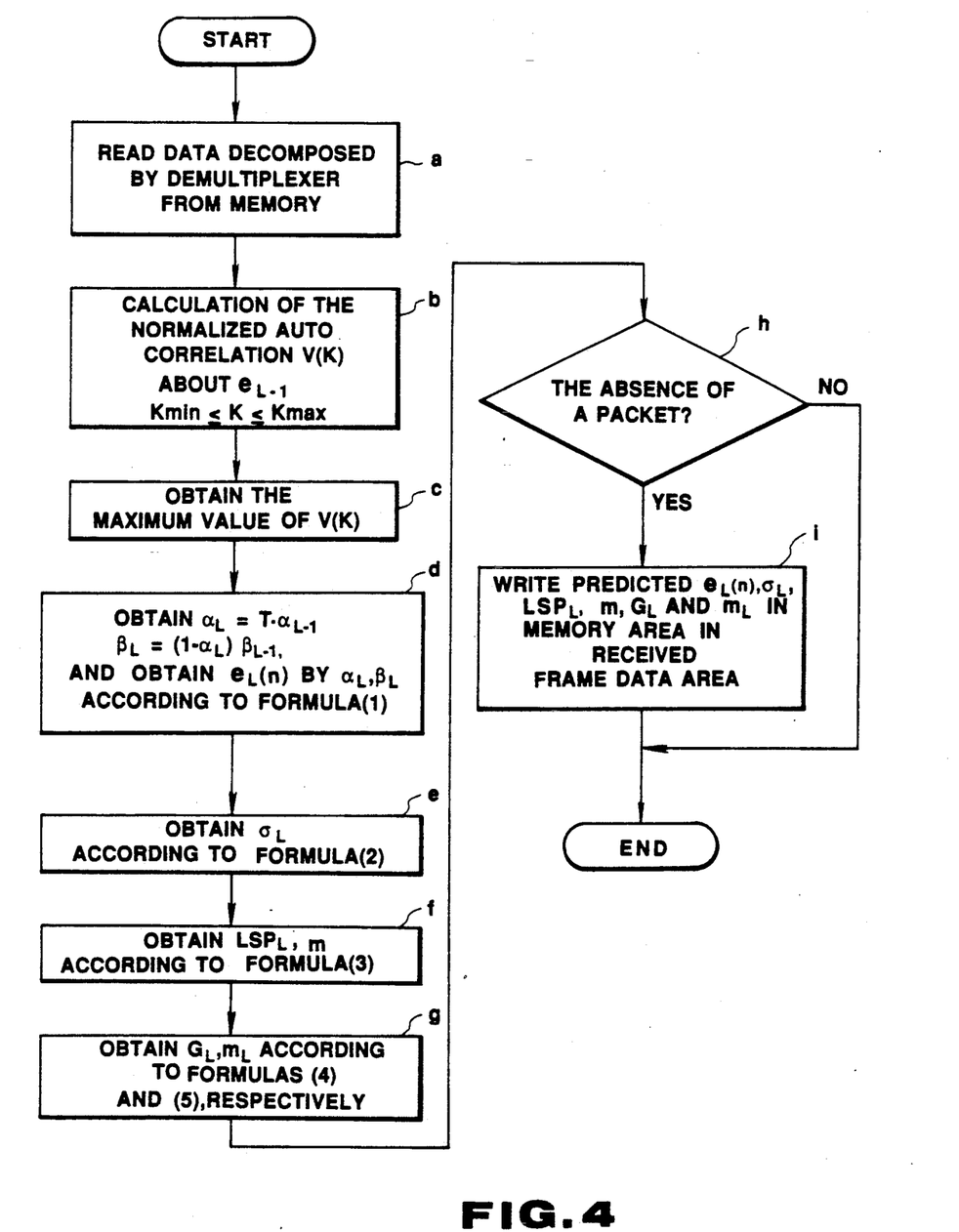
FIG. 4 is a diagram showing a schematic processing flow of an interframe-predicting unit which exhibits a characteristic function in the embodimental device.

FIG. 4 shows the processing procedure of the above-described predicting processing. First, the pedicting processing is commenced by taking in the received packet data via the demultiplexer 21 (step a). The normalizing autocorrelation is then calculated from the predicted remnant signal e L−1(n) obtained at the inverse-quantizer 22 (step b), and the maximum value thereof is obtained (step c). Then, αL and βL are obtained as described above, and the predicted value e L(n) of the remnant signal is obtained according to Formula (1) (step e).

Subsequently, σL, LSP L,m, G L and m L are further predicted according to the above-described Formulas (2), (3), (4) and (5), respectively (steps e, f and g).

The above-described predicting processings are sequentially executed in a frame unit.

The above-described control unit 32 judges whether the absence of a packet is detected or not (step h). When the absence of a packet is detected, the coding processing of voice data is executed using the predicted information as described above (step i).

As a result, by the present device thus configured, even when voice information is transmitted as packets submitted to the encoding processing in a frame unit, it is possible to effectively deal with the absence of a packet, and decode and synthesize a high-quality sound by effectively complementing the voice information of the portion where the absence of a packet exists by the predicted information. Moreover, since it is possible to deal with the absence of a packet by such predicting processing, it becomes possible to effectively execute the above-described encoding processing in a frame unit, and perform a high-efficiency packet transmission.

Further, since it is not necessary to perform decoding processing after storing packet data over plural frames as shown in the above-described conventional example, there is no problem of time delay, and it becomes possible to favorably maintain the naturalness of conversation. Furthermore, since the interframe prediction at the decoding system described above is the generation of parameters at the so-called vocoder, the amount of the processing does not significantly increase. Moreover, the inventive device can be simply realized by a small amount of hardware. Thus, the present invention has large practical effects.

It is to be noted that the present invention is not limited to the embodiments described above. For example, it is possible to modify the algorithm for the interframe prediction or the like without departing from the spirit and scope of the invention.

What is claimed is:

1. A voice decoding device in which a voice signal sampled at a predetermined period is compression-coded into pitch information, a coefficient of short term prediction, power information, and a normalized prediction residual signal, in a frame unit consisting of a predetermined number of samplings, where the compression-coded voice signal transmitted in the form of packets is decoded, said device comprising:

extracting means for extracting pitch information, a co-efficient of short term prediction, power information, and a normalized prediction residual signal from a received packet;

interframe predicting means for predicting pitch information, a coefficient of short term prediction, power information, and a normalized prediction residual signal to be received next from pitch information, a coefficient of short term prediction, power information and a normalized prediction residual signal contained in a plurality of packets received in the past and at present, detection means for monitoring a time period between the reception of a packet and reception of a next packet, and for detecting an absence of a packet when the time period exceeds a predetermined value;

selection means for selecting pitch information, the coefficient of short term prediction, the power information, and the normalized prediction residual signal extracted by the extracting means, when the absence of a packet is not detected, and for selecting the pitch information, the coefficient of short term prediction, the power information, and the normalized prediction residual signal predicted by the interframe predicting means when the absence of a packet is detected; and decoding means for decoding the voice signal based on the pitch information, the coefficient of short term prediction, the power information, and the normalized prediction residual signal selected by the selection means.

2. A voice decoding device according to claim 1, wherein the interframe predicting means performs prediction of the pitch information, the coefficient of short term prediction, the power information and the normalized prediction residual signal by learning from present and past data.

3. A voice decoding device according to claim 2, wherein the interframe predicting means performs the interframe prediction of the pitch information, the coefficient of short term prediction, the power information, and normalized prediction residual signal based on the following formulae:

$$\hat{A}(N+1) = f(A(N), A(N-1), \ldots, A(N-K), E(N))$$

$$E(N) = \hat{A}(N) - A(N),$$

where
$\hat{A}(N+1)$ is the predicted value at the moment $(N+1)$ relative to the present N,
$f(A(N), A(N-1), \ldots, (N-K), A(N-K), E(N))$ is the linear function predicting the moment $(N+1)$ from the present and past received data, and
$E(N)$ is the difference between the predicted value and the recieved data.

4. A voice decoding device according to claim 1, wherein the interframe predicting means predicts the normalized prediction residual signal according to one of modeled data of a pulse train, white noise, and linear combination thereof, by learning present and past received data and actual received data.

5. A voice decoding device according to claim 4, wherein the interframe predicting means predicts the normalized prediction residual signal by executing the following formula:

$$eL(n) = \alpha L\, Sp(n) + \beta L\, Sn(n),$$

wherein
$\alpha L = T \cdot \alpha L - 1$

T is the maximum value of the normalized autocorrelation $V(n)$ about $eL-1(n)$ in a range from kmax to kmin, $$T = \max\left\{ \left( 1/\sum_{n=0}^{N-1} eL - 1(n) \right) \sum_{n=0}^{N+1-K} eL - 1(n)eL - 1(n+K) \right\}$$

$Kmax \leq K \leq Kmin$
$\beta L = (1 - \alpha L)\beta L - 1$
$Sp(n) = 1\ (n = 1)$
$\quad\quad\quad\ 0\ (n = 0)$ Sn(n) is white noise.

6. A voice decoding device according to claim 3, wherein said pitch information includes a pitch gain and a pitch period, and the interframe predicting means predicts the pitch gain and the pitch period by a linear function given by the following formulae:

$$GL = GL - 1 + (GL - 2 - GL - 3)$$

$$mL = mL - 1 + (mL - 2 - mL - 3)$$

wherein,
GL is defined as the pitch gain to be predicted,
mL is defined as the pitch period to be predicted,
GL−1, GL−2, and GL−3 are defined as the past received pitch periods in received order, and
mL−1, ml−2, and mL−3 are defined as the past received pitch periods in received order.

7. A voice decoding device according to claim 1, wherein the interframe predicting means transforms said coefficient of short term prediction of said past received packet into an LSP parameter, predicts an LSP parameter corresponding to said coefficient of short term prediction of said packet to be received by utilizing said transformed LSP parameter, and obtains a predictive value of said coefficient of short term prediction by retransforming said predicted LSP parameter.

8. A voice decoding device according to claim 7, wherein said prediction of said LSP parameter is performed in accordance with a combined linear function comprising a prediction formula for voice sound and a prediction formula for voiceless sound.

9. A voice decoding device according to claim 8, wherein said combined linear function is given by the following formula:

$$LSP\,L,m = \alpha L\,(LSP\,L - 1,m + 1 - LSP\,L - 1,m) +$$

$$\beta L(LSP\,L - 2,m - LSP\,L - 1,m)$$

wherein
LSP L,m is defined as the LSP parameter of mth term with respect to the coefficient of short term prediction to be predicted,
LSP L−1,m is defined as the LSP parameter of mth term with respect to the last received coefficient of short term prediction,
LSP L−1,m+1 is defined as the LSP parameter of m+1th term with respect to the last received coefficient of short term prediction,
LSP L−2,m is defined as the LSP parameter of mth term with respect to the coefficient of short term prediction received before the last received one,
$\alpha L$ is defined as the parameter representing the degree of the voice sound with respect to the coefficient of short term prediction to be predicted, and
$\beta L$ is defined as the parameter representing the degree of the voiceless sound with respect to the coefficient of short term prediction to be predicted.

10. A voice decoding device according to claim 3, wherein said power information predicted by said interframe predicting means is given by the following formula:

$$L = L - 1 + (L - 2 - L - 3),$$

wherein
L is defined as the power to be predicted, and
L−1, L−2, L−3 are defined as the past received powers in the order received.

11. A voice decoding device according to claim 1, wherein said interframe predicting means predicts said normalized prediction residual signal of said packet to be received as an impulse signal when voice sound is received and predicts the residual signal to be predicted by approximating said residual signal to be predicted with white noise when voiceless sound is received.

12. A voice decoding device according to claim 11, wherein said normalized prediction residual signal predicted by said interframe predicting means is given by the following formula:

$$eL(n) = \alpha L\, Sp(n) + \beta L\, Sn(n), \text{ wherein}$$

$$Sp(n) = \begin{cases} 1 & (n = 1) \\ 0 & (n = 0) \end{cases}$$

Sn(n) is defined as white noise,
eL(n) is defined as the normalized prediction residual signal to be predicted,
αL is defined as the parameter representing the degree of the voice sound to be predicted with respect to the coefficient of short term prediction to be predicted, and
βL is defined as the parameter representing the degree of the voiceless sound with respect to the coefficient of short term prediction to be predicted.

13. A voice decoding method in which a voice signal sampled at a predetermined period is compression-coded into pitch information, coefficient of short term prediction, power information, and a normalized prediction residual signal in a frame unit consisting of a predetermined number of samplings, and the compression-coded voice signal transmitted in the form of packets is decoded, said method comprising the steps of:
predicting pitch information of a packet to be decoded from pitch information of a plurality of received packets;
predicting a coefficient of short term prediction of said packet to be decoded from coefficients of short term prediction of said plurality of received packets;
predicting power information of said packet to be decoded from power information of said plurality of received packets;
predicting a normalized prediction residual signal of said packet to be decoded from normalized prediction residual signals of said plurality of received packets;
detecting the absence of a packet from said received packets when a next packet is not received within a predetermined period of time;
selecting said pitch information, said coefficient of short term prediction, said power information and said normalized prediction residual signal of a received packet when the absence of a packet is not detected, and selecting said pitch information, said coefficient of short term prediction, said power information, and said normalized prediction residual signal when the absence of the packet is detected; and
executing the decoding processing of the voice signal in accordance with said pitch information, said coefficient of short term prediction, said power information and said normalized prediction residual signal selected.

14. A method according to claim 13, wherein the step of predicting pitch information of a packet to be decoded comprises the substeps of:
obtaining a first linear function for predicting said pitch information of said packet to be decoded from said pitch information of the received packet; and
predicting said pitch information of said packet to be decoded in accordance with a first linear function.

15. A method according to claim 14, wherein said first linear function is given by the following formula:

$$GL = GL-1 + (GL-2-GL-3)$$

$$mL = mL-1 + (mL-2-mL-3),$$

wherein
GL is defined as the pitch gain to be predicted,
mL is defined as the pitch period to be predicted,
GL−1, GL−2, and GL−3 are defined as the past received pitch gains in received order, and
mL−1, mL−2, and mL−3 are defined as the past received pitch periods in received order.

16. A method according to claim 13, wherein the step of predicting a coefficient of short term prediction of said packet to be decoded comprises the substeps of:
transforming said received coefficient of short term prediction into an LSP parameter;
obtaining a second linear function used for predicting an LSP parameter corresponding to said coefficient of short term prediction of said packet to be decoded by using said transformed LSP parameter;
predicting said LSP parameter corresponding to said coefficient of short term prediction of said packet to be decoded in accordance with said second linear function; and
obtaining a predictive value of said coefficient of short term prediction by retransforming said predicted LSP parameter.

17. A method according to claim 16, wherein said second linear function is given by the following formula:

$$LSP\,L,m = \alpha L\,(LSP\,L-1,m+1 - LSP\,L-1,m) + \beta L(LSP\,L-2,m - LSP\,L-1,m),$$

where
LSP L,m is defined as the LSP parameter of mth term with respect to the coefficient of short term prediction to be predicted,
LSP L−1,m is defined as the LSP parameter of mth term with respect to the last received coefficient of short term prediction,
LSP L−1,m+1 is defined as the LSP parameter of m+1th term with respect to the last received coefficient of short term prediction,
LSP L−2,m is defined as the LSP parameter of mth term with respect to term coefficient of short term prediction received before the last received one,
αL is defined as the parameter representing the degree of voice sound with respect to the coefficient of short term prediction to be predicted, and
βL is defined as the parameter representing the degree of voiceless sound with respect to the coefficient of short term prediction to be predicted.

18. A method according to claim 13, wherein the step of predicting power information comprises the substeps of:
obtaining a third linear function used for predicting said power information of said packet to be decoded from said power information of said received packet; and
predicting power information of said packet to be decoded in accordance with said third linear function.

19. A method according to claim 18, wherein said third linear function is given by the following formula:

$$L = L-1 + (L-2-L-3),$$

where
- L is defined as the power to be predicted, and
- L−1, L−2, L−3 are defined as the past received powers in the order received.

20. A method according to claim 13, wherein the step of predicting a normalized prediction residual signal of said packet to be decoded comprises the substeps of:
- obtaining a linear function for predicting said normalized prediction residual signal of the packet to be decoded from said normalized prediction residual signal of said received packet; and
- predicting said normalized prediction residual signal of said packet to be decoded in accordance with said linear function.

21. A method according to claim 20, wherein said linear function is given by the following formula:

$$eL(n) = \alpha L\ Sp(n) + \beta L\ Sn(n), \text{ where}$$

$$Sp(n) = \begin{cases} 1 & (n = 1) \\ 0 & (n = 0) \end{cases}$$

Sn(n) is defined as white noise,
eL(n) is defined as the normalized prediction residual signal to be predicted,
αL is defined as the parameter representing the degree of voice sound with respect to the coefficient of short term prediction to be predicted, and
βL is defined as the parameter representing the degree of voiceless sound with respect to the coefficient of short term prediction to be predicted.

* * * * *

UNITED STATES PATENT AND TRADEMARK OFFICE
CERTIFICATE OF CORRECTION

PATENT NO. : 5,148,486
DATED : September 15, 1992
INVENTOR(S) : Norimasa KUDOH

It is certified that error appears in the above-identified patent and that said Letter Patent is hereby corrected as shown below:

Claim 1, column 8, line 37, change "co-efficient" to --coefficient--.

Claim 3, column 9, line 11, before "normalized" insert --the--.

Claim 3, column 9, line 25, change "recieved" to --received--.

Claim 4, column 9, line 29, before "linear" insert --a--.

Claim 6, column 10, line 4, change "ml-2" to --mL-2--.

Signed and Sealed this

Fifteenth Day of February, 1994

Attest:

BRUCE LEHMAN

Attesting Officer   Commissioner of Patents and Trademarks